April 1, 1958 T. W. JOHNSON 2,828,680
MULTIPLE-SECTIONED FARM IMPLEMENT
Filed May 26, 1955 2 Sheets-Sheet 1

INVENTOR.
THEODORE W. JOHNSON

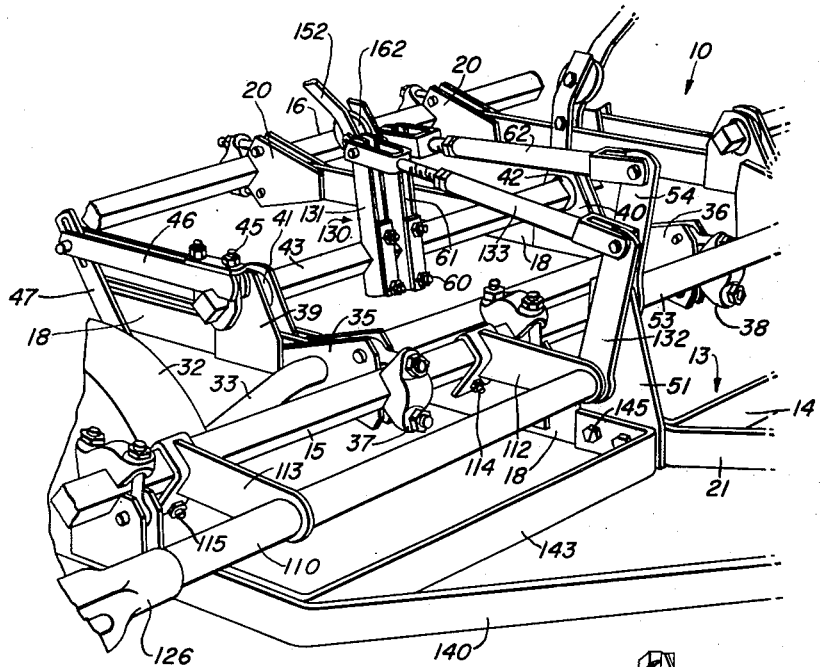

United States Patent Office 2,828,680
Patented Apr. 1, 1958

2,828,680

MULTIPLE-SECTIONED FARM IMPLEMENT

Theodore W. Johnson, Des Moines, Iowa, assignor to Deere Manufacturing Co., Dubuque, Iowa, a corporation of Iowa Application May 26, 1955, Serial No. 511,197

5 Claims. (Cl. 97—235)

This invention relates to a ground working type of farm implement having a plurality of sections and specifically of the type having a main central section with laterally spaced auxiliary sections extending from the sides of the main section.

Large scale farming, as done in many areas of the United States, plus the advent of the large draft tractors, have caused extensive use in those areas of the multiple-section type of farm implement. In many instances this type of implement is built up in sections by providing a standard or narrow width implement, which serves as a central or main section, with a series of outrigger or laterally extending sections. When constructed in this manner the outrigger sections are sold as attachments which may be purchased optionally depending upon the type of farming done.

There are several problems which arise in building up the implement in this manner. As an example, additional structure is often needed in the framework of the central or main section in order to support the additional load created by the outrigger section. Likewise, since the addition of the outer sections will often more than double the width of the implement, in order for the implement to be able to travel over irregular or uneven ground, flexibility must must be incorporated in the connections between the main section and the auxiliary sections to permit vertical movement of the sections relative to one another. If there are operative parts on the outer sections and such parts are controlled or driven from the central section, flexibility as above prescribed must also be supplied in the drive.

Also, normally required in this type of implement is means for raising the outer sections and securing them in their vertical or raised position so that the implement may pass through gate openings, or be transported over normal width roads or highways.

The primary object of this invention is to provide a multiple sectioned implement which incorporates the use of a standard implement for the central section, and two outer attachment sections which may be easily attached or removed from the central section as desired, and which includes as part of the attachment sections additional structural members for adding strength to the frame of the standard implement.

It is also an object of this invention to provide torque-transmitting drive means which may be attached to an operative part on the main section and which will transmit torque to a similar or other type of operative part on the outrigger sections or attachments. Featured in the torque transmitting means are flexible means which will not impair the flexibility in the connection between the outer sections and the central section.

Other objects and advantages of the invention will become apparent to those skilled in the art as the nature of the invention is better understood from the following detailed description illustrated in the accompanying drawings.

Fig. 2 is a front right perspective of portions of the right outer section and the central section. For purposes of clarity the cultivator tools are not shown in this view.

Figure 1:
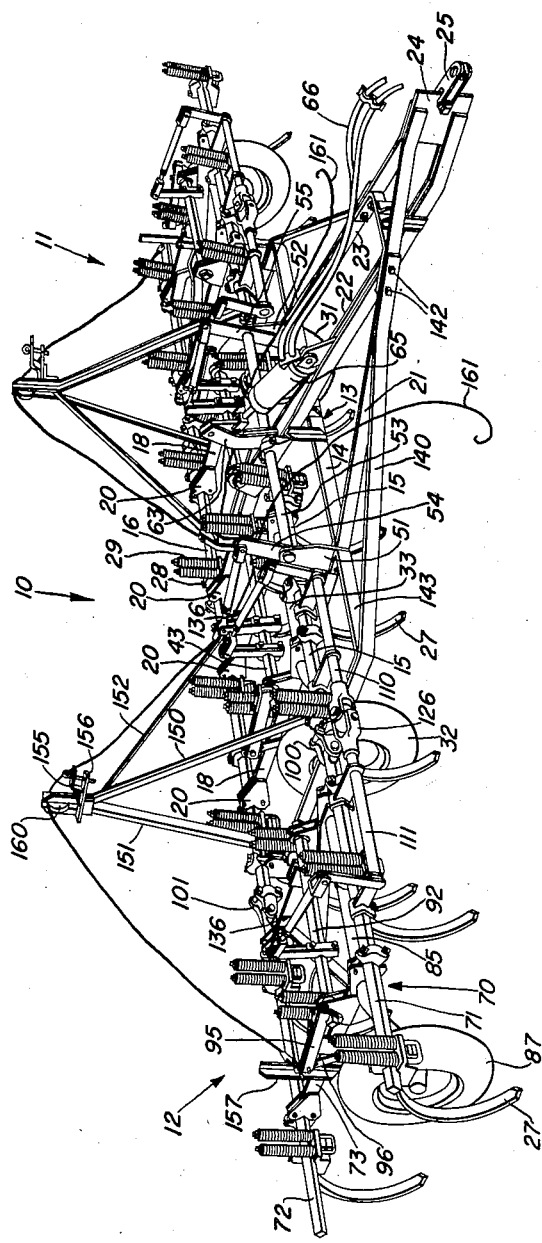
Fig. 1 is a front right perspective of a multiple-section cultivator which incorporates the features of the invention.

Fig. 3 is a right front perspective of the outer section and a portion of the main section. It features in detail different portions of the outer section than that shown in Fig. 2. Likewise for purposes of clarity the cultivator tools are not shown in this view.

The implement assembly comprises a main or central section 10 and a pair of outrigger or auxiliary sections 11 and 12, the section 11 being mounted to the left of the central section 10 and the section 12 being mounted to the right of the central section 10. Left and right, for purposes of this specification, will be determined by viewing the implement from its rear. The central section includes a laterally disposed rigid framework 13 made up of a forward transverse structural member 14, a front transverse toolbar 15 and a rear transverse toolbar 16, all of which are rigidly connected to fore-and-aft extending structural members 18 by suitable clamps as at 20. Convergent structural members 21, 22, 23, extend forwardly from the framework 13 to an upright plate 24 which is provided at its forward edge with a suitable clevis 25 for connecting the implement to a tractor or other type of draft vehicle. As shown in Fig. 1, the toolbars 15 and 16 carry cultivator shovels 27 which are fixed to the bars by suitable clamps 28 which incorporate the use of a cushioning or spring means 29. It should here be noted that while the implement is shown in Fig. 1 as a cultivator it should be recognized that the cultivator teeth are shown for illustrative purposes only and a plurality of different tools can be used merely by replacing the tools shown with them. The type of tool is unimportant for purposes of this invention.

The frame 13 is carried by a pair of transversely spaced apart wheels 31 and 32 which in turn are mounted on the frame by means of crank axles of which only the right crank axle 33 is visible in the drawings. The crank axles for the wheels 31 and 32, as well as the means for raising and lowering the wheels relative to the framework 13, are similar for both the left wheel 31 and for the right wheel 32. Therefore, explanation of the structure pertaining to the wheels will be limited specifically to that shown relative to the right wheel 32 with the understanding that a similar structure is also available for use with the left wheel 31.

The crank axle 33 is rockably supported on the forward toolbar 15 by means of transversely spaced brackets 35 and 36 which are clamped to the toolbar as at 37 and 38. The rearward portion of the brackets 35 and 36 are fixed to and serve also to support the forward ends of a pair of the fore-and-aft extending structural members 18. Mounted on the aforesaid structural members 18 are two upright brackets 39 and 40 carrying suitable bushings 41 and 42, respectively, in which is mounted a relatively short square-sectioned rotatable member or rockshaft 43. Fixed to the right end of the rockshaft 43 by means of a U-bolt 45 is a rearwardly extending arm 46. A depending link 47 connects the rear end of the arm 46 to the wheel. Viewing Fig. 2, therefore, it becomes apparent that rocking movement of the shaft 43 will result in raising or lowering the frame 17 in an amount proportionate to the angular displacement of the crank axle 33.

Mounted for rocking motion on two upright and transversely spaced portions 51 and 52 of the framework 13 is a transverse rockshaft 53 extending transversely across and forwardly of the central section 10 which has fixed on its respective ends upright arms 54 and 55. In fore-and-aft alinement with the arm 54 which is mounted on the right end of the shaft 53 is a rockarm 61 clamped as at 60 at its lower end to the shaft 43. The upper ends of the arms 54 and 61 are interconnected by a turnbuckle type link 62. A lever arm 63 is fixed by welding or other suitable means on a central portion of the rockshaft 53 and is connected at its upper end to the rear end of a ram of a hydraulic unit 65 mounted on the forwardly extending frame member 22. Hydraulic hose 66 extend from the cylinder 65 for attachment to a conventional type power lift on the tractor. Thus, the implement may be raised or lowered by an operator positioned on the tractor by causing the hydraulic unit 65 to impart rocking movement to the rockshaft 53, which in turn will cause the shaft 43 to rock, thereby resulting in the frame 13 being raised or lowered depending upon the direction of the action of the ram on the arm 63.

The auxiliary or outrigger sections 11 and 12 are similar to one another with the exception of course that one is mounted to the left side of the implement and the other mounted to the right side of the implement. Therefore, for purposes of explanation the description will be limited to the auxiliary section 12, it being fully understood that the outer sections 11, 12 are identical with the above mentioned exception.

The outer section 12 is made up of a laterally disposed framework 70 and includes front and rear transverse tool bars 71 and 72 which are interconnected to one another by fore-and-aft extending structural members 73. The members 73 are connected to the forward toolbar 71 by clamping members 75 and 76 and to the rear toolbar 72 by clamping members 77 and 78. The framework 70 is cross-braced by the members 79 and 80. The forward clamping members 75 and 76 are suitably apertured to receive a crank axle 85 which has a downwardly extending portion 86 on which a wheel 87 is mounted. Fixed on each of the fore-and-aft extending structural members 73 are upwardly extending brackets 88, 89 which carry bushings 90, 91 for rockably mounting a square-sectioned rotatable member or rockshaft 92. Clamped to the outer end of the rockshaft 92 is a fore-and-aft extending arm 95 which has pivotally connected at its rearward end a downwardly extending link 96 whose lower end is connected to the axle portion 86. The framework 70 obviously may be raised or lowered by rocking movement of the shaft 92 and will have a vertical displacement of an amount in proportion to the angular displacement of the crank axle 85.

The inner side of the auxiliary section is connected to the corresponding outer side of the main or central section by providing fore-and-aft aligned hinges 100 and 101 which are connected to the outer ends of the respective front and rear toolbars 15 and 16 of the main section 10 and to the inner ends of the transverse toolbars 71 and 72 of the auxiliary section 12 thereby permitting free vertical movement of the outer section relative to the central section about a fore-and-aft extending axis. The wheel 87 is in transverse alinement with the wheels 31 and 32 and the shafts 71—72—92 and the crank axle 85 are also in transverse alinement with their counterparts on the center section.

Mounted forwardly of the center and right sections 10, 12 is a pair of transverse drive shafts 110 and 111. The shafts are in transverse alinement with one another with one having an end in proximity to an end of the other. The innermost or first shaft 110 is rotatably carried on the center section by means of brackets 112 and 113 which are removably connected to the forward toolbar 15 by means of clamp bolts 114 and 115. The outermost or second shaft 111 is rotatably carried on the outer section 12 by means of forwardly extending brackets 120, 121 which are mounted on the forward toolbar 71 by suitable clamps as at 122 and 123. Interconnecting the ends of the drive shafts 110 and 111 is a torque transmitting and articulate connection in the form of a universal joint 126 which is operative to bend about a point on an extension of the fore-and-aft extending axis as determined by the hinges 100 and 101.

First force transmitting linkage means 130, similar to that already described for extending power between the rockable member 53 and the shaft 43 and comprising an upright arm 131 fixed to the shaft 43, an upright arm 132 fixed to the inner end of the drive shaft 110, and a turnbuckle type link 133 which interconnects the arms 131, 132 is used to transmit rocking motion from the shaft 43 to the drive shafts 110 and 111. A similar and second force transmitting linkage means 136 extends from the outer end of the drive shaft 111 to the transverse bar 90 and comprises an upright arm 137 fixed to the outer end of the drive shaft 111, and an upright arm 138 fixed to the shaft 90, and a turnbuckle type link 139 which interconnects the arms 137, 138. Viewing the figures, particularly Fig. 1, it becomes apparent that when the hydraulic cylinder 65 operates to create a rocking motion in the shaft 43 for raising or lowering the framework 13 of the center section 10, the linkage 130 will operate to drive shafts 110 and 111 thereby transmitting a similar motion to the shaft 92. Thus, all the wheels on both the central and outer sections will operate to raise or lower their respective frames in unison.

To provide additional structural strength to the framework 13 when the outrigger section 12 is attached, an auxiliary or complementary framework is provided with the section. Specifically this framework comprises an outer convergent frame member 140 having a fore-and-aft extending portion which extends the fore-and-aft length of the implement with its rear end connected to the rear toolbar 16, and a portion disposed forwardly of the main frame and converging from the forward end of the fore-and-aft extending portion to a position adjacent to the converging structural member 21, and is bolted thereto as indicated at 142. A transverse bracer member 143 is positioned forwardly of the central section 10, and has one end fixed to the member 140 and has its other end bolted to the framework 13 as indicated at 145.

Upright tripod structures are provided to serve as securing means for holding the outer sections in their upright position. For purposes of brevity, the description will also be limited to that shown on the right side of the implement, it being fully understood that the one on the left is similar in detail. Two legs 150, 151 of the tripod are fixed in any suitable manner at their lower ends to the fore-and-aft portion of the structural member 140. The other leg 152 of the tripod extends inwardly and is connected at its lower end to a fore-and-aft extending structural member 18 by a U-clamp 153, thereby making it readily detachable from the member 118. Mounted on the upper end of the tripod structure is connecting means made up of two vertically spaced apart brackets 155, 156 which have vertically aligned apertures and which are positioned to receive between them, when the outer section 12 is swung to its folded position, the angle iron upright 157 which is fixed to the outer fore-and-aft extending structural member 73. The angle arm 157 is also apertured, thereby permitting a drop pin 158 or other securing member to pass through the apertures in the brackets 155, 156 and in the angle iron 157 to secure the auxiliary section in its folded position. Also mounted on the apex of the tripod is a pulley 160 over which is threaded a cable 161 having an end thereof connected to the outer side of the auxiliary section 12 and which passes around an additional pulley 162 mounted on the lower end of the tripod leg 152. The opposite end of the cable 161 is connected to suitable means on the tractor which permits the outer section 12 to be raised to or lowered. It should here be noted that when it is desired to raise the outrigger section 12 to its folded position, the hydraulic unit 65 will normally have caused the universal joint 126 to be rocked to a position whereby an axis of one of the cross pins of the universal joint will be coaxial with the fore-and-aft extending axis as determined by the hinges 100, 101, thereby permitting unrestricted angular displacement between the shafts 110, 111. This latter position of the universal joint coincides with that existing when the wheels are in transport position.

Viewing the implement as a whole, it becomes apparent that the outer section 12 may be connected or disconnected from the main section 10 by removing or replacing, as the case may be, the bolts 142, 145, the U-clamp 153, the hinges 100 and 101 to or from the outer ends of the respective toolbars 15 and 16, the brackets 112 and 113 to or from the front toolbar 15, and the upright arm 131 to or from the shaft 43. Thus, the outrigger or outer sections may serve only as attachments to the center section, thereby, from a merchandizing standpoint providing a method in which a standard tool carrying implement may be enlarged if desired to a multiple sectioned implement.

It should be recognized that while there has been provided means for raising or lowering the framework of the outer sections by adjusting the wheels relative to the framework, a similar type of drive could be used to operate any operative part on the outer sections as long as a torque or moment arm force was required. Also as previously mentioned while the tool carrier has been shown to operate with the cultivator type tools, there is no intention to so limit the invention to any particular type of implement.

What is claimed is:

1. A tool-carrying implement of the type described having a plurality of sections including a center section having a laterally disposed rigid framework with transversely spaced end portions; a rockable member mounted on the framework, and transversely spaced wheel means operative to raise or lower the framework in response to movement of the rockable member; a pair of outer sections, each having a rigid frame with an end portion adjacent to one of the aforesaid end portions of the center section framework, each having a rockable member thereon, and each having wheel means operative to raise or lower its respective frame in response to movement of the respective rockable member; hinge means connecting each of the end portions of the frames to the respective adjacent end portion on the center framework permitting each of the outer sections to swing vertically about a fore-and-aft extending axis; means operative to raise or lower each of the outer sections in unison with raising or lowering the center section comprising a transverse first shaft mounted on the center section, a transverse second shaft mounted on the respective outer section, a universal type joint operative to bend about a point on the aforesaid fore-and-aft extending axis connecting the ends of the first and second shafts, first force transmitting linkage means extending from the rockable member on the center section to the first shaft causing said first and second shafts to rock in unison with the rockable member on the center section, second force transmitting linkage means mounted on the respective outer section and extending from the second shaft to the rockable member on the outer section resulting in their rocking in unison; and means mounted on the implement connected to the rockable member on the center section for imparting rocking motion thereto.

2. A tool-carrying implement of the type described having a plurality of sections including a center section having a rigid framework with transversely spaced end portions and upright portions projecting from each of the end portions, a rockable member mounted on the framework, and transversely spaced wheel means operative to raise or lower the framework in response to movement of the rockable member; a pair of outer sections, each having a rigid frame with an end portion adjacent to one of the aforesaid end portions of the center section framework, each having a rockable member thereon, and each having wheel means operative to raise or lower its respective frame in response to movement of the respective rockable member; hinge means connecting each of the end portions of the frames to the respective adjacent end portion on the center framework permitting each of the outer sections to swing vertically about a fore-and-aft extending axis; means operative to raise or lower each of the outer sections in unison with raising or lowering the center section comprising a transverse first shaft mounted on the center section, a transverse second shaft mounted on the respective outer section, a universal type joint operative to bend about a point on the aforesaid fore-and-aft extending axis connecting the ends of the first and second shafts, first force transmitting linkage means extending from the rockable member on the center section to the first shaft causing said first and second shafts to rock in unison with the rockable member on the center section, second force transmitting linkage means mounted on the respective outer section and extending from the second shaft to the rockable member on the outer section resulting in their rocking in unison; means mounted on the implement connected to the rockable member on the center section for imparting rocking motion thereto; and connecting means mounted on the upright portions for releasably securing the outer sections in a substantially upright position.

3. A tool-carrying implement of the type described having a plurality of sections including a center section having a laterally disposed rigid framework with transversely spaced end portions, a transverse rockshaft mounted on the framework, and transversely spaced wheel means operative to raise or lower the framework in response to movement of the transverse rockshaft; two outer sections, each having a rigid frame with an end portion adjacent to one of the aforesaid end portions of the center section framework, each having a transverse rockshaft thereon, and each having wheel means operative to raise or lower its respective frame in response to movement of the respective rockshaft; hinge means connecting each of the end portions of the outer frames to the respective adjacent end portion on the center framework permitting the outer sections to swing vertically about a fore-and-aft extending axis; means operative to raise or lower each of the outer sections in unison with raising or lowering the center section comprising a first transverse shaft rockably mounted on the center section; a second transverse shaft rockably mounted on the respective outer section and substantially in transverse alinement with the first transverse shaft; torque transmitting joint means operative to bend about a point on the aforesaid fore-and-aft extending axis connecting the ends of the first and second shafts, first force transmitting linkage means extending from the rockshaft on the center section to the respective first shaft causing said first and second shafts to rock in unison with the rockshaft on the center section, second force transmitting linkage means mounted on the respective outer section and extending from the second shaft to the respective rockshaft on the outer section resulting in their rocking in unison; and power means mounted on the implement connected to the rockshaft on the center section for imparting rocking motion thereto.

4. An extension for a tool-carrying implement of the type having a laterally disposed implement framework with transversely spaced end portions and carried on wheel means operative to raise or lower the framework in response to movement of a rockable member mounted thereon, the extension comprising: a rigid tool carrying extension frame with transversely spaced end portions, a rockable member mounted thereon, and carried on wheel means operative to raise or lower the extension frame in response to movement of the rockable member on the frame; a transverse shaft rockably mounted on the frame; force transmitting means connecting the rockable member on the frame to the transverse shaft thereby resulting in their rocking in unison; fore-and-aft aligned hinge means mounted on one of the end portions of the extension frame and connectible with one of the end portions of the implement framework; a universal joint mounted on the end of the transverse shaft operative to bend about a point in fore-and-aft alinement with the hinge means thereby permitting the hinge means and universal joint to bend on a commn axis; a transverse drive shaft having one end connected to the universal joint; and force transmitting linkage means connected to the transverse drive shaft and adaptable for connection to the rockable member on the implement framework for causing the drive shaft and rockable member on the framework to rock in unison.

5. An extension for a tool-carrying implement of the type having a laterally disposed implement framework with transversely spaced end portions and carried on wheel means operative to raise or lower the framework in response to movement of a transverse rockshaft mounted thereon, the extension comprising: a rigid tool carrying extension frame with transversely spaced end portions, a transverse rockshaft mounted thereon, and wheel means operative to raise or lower the extension frame in response to movement of the transverse rockshaft; hinge means mounted on one of the end portions of the extension frame and connectible with one of the end portions of the implement framework; drive shaft means including a pair of transverse shafts, one rockably mounted on the frame and the other having means connected thereto for rockably mounting it on the implement framework and connected to one another by a universal joint operative to bend about a point in alinement with the hinge means thereby permitting the hinge means and universal joint to bend on a common axis; a pair of force transmitting linkages, one of said linkages extending between the rockshaft on the extension and one of the drive shafts to cause the former to operate in response to the latter, the other of the force transmitting linkages being connected to the other of the drive shafts and adaptable for connection to the rockshaft on the framework and operative upon connection thereto to cause the drive shafts to rock in response to movement of the rock shaft.

References Cited in the file of this patent

UNITED STATES PATENTS

| | | |
|---|---|---|
| 829,766 | Chase | Aug. 28, 1906 |
| 848,613 | Feherenbacher | Mar. 26, 1907 |
| 2,334,729 | Sefcovic | Nov. 23, 1943 |
| 2,377,578 | Scarlett | June 5, 1945 |
| 2,590,965 | Huston | Apr. 1, 1952 |
| 2,620,200 | Anderson | Dec. 2, 1952 |
| 2,641,886 | Graham | June 16, 1953 |

FOREIGN PATENTS

| | | |
|---|---|---|
| 49,048 | Sweden | Apr. 11, 1919 |
| 440,520 | Germany | Feb. 10, 1927 |